July 28, 1936.  J. H. HUNT  2,048,866
ANTIROLL DEVICE
Filed Feb. 16, 1934   4 Sheets-Sheet 1

Inventor
John H. Hunt
By Blackmore, Spencer & Flint
Attorney

July 28, 1936.   J. H. HUNT   2,048,866
ANTIROLL DEVICE
Filed Feb. 16, 1934   4 Sheets-Sheet 2

Inventor
John H. Hunt

By Blackmore, Spencer & Flint
Attorneys

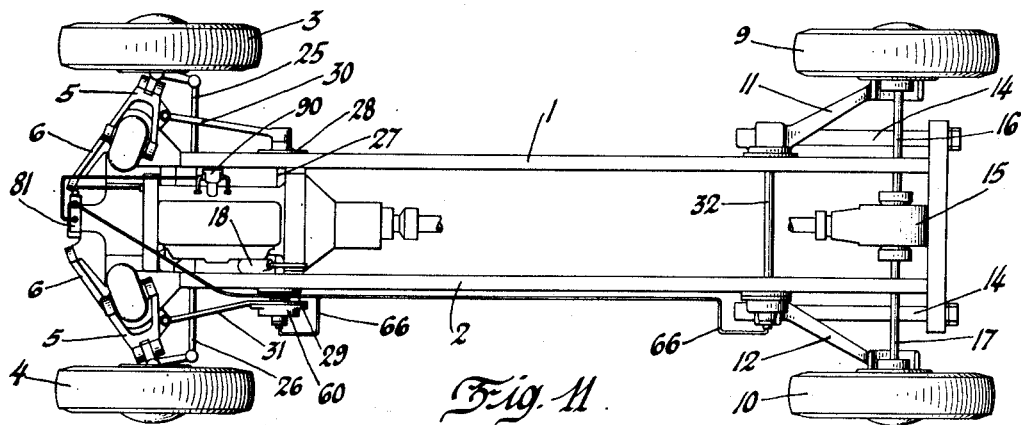
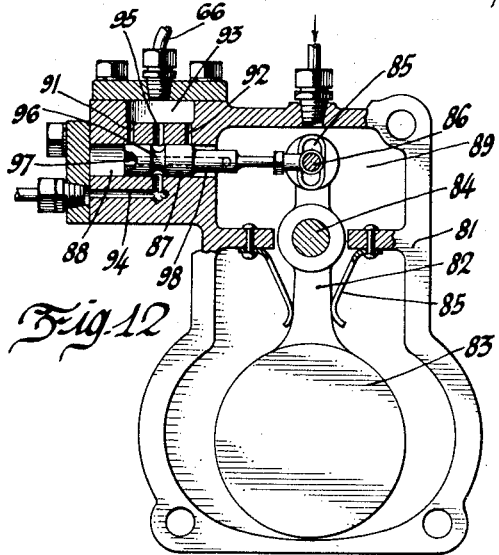
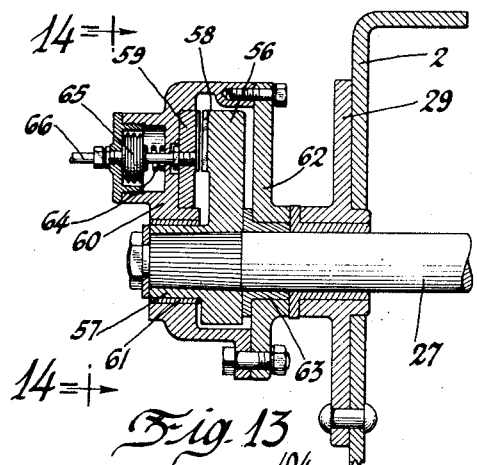
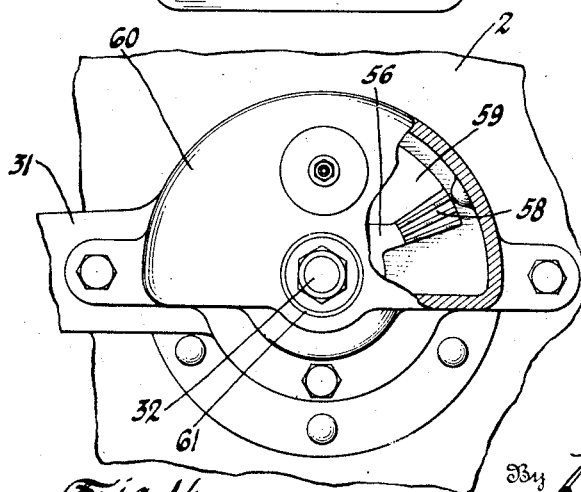

July 28, 1936.     J. H. HUNT     2,048,866
ANTIROLL DEVICE
Filed Feb. 16, 1934     4 Sheets-Sheet 4

Inventor
John H. Hunt
By Blackmore, Spence & Flint
Attorneys

Patented July 28, 1936

2,048,866

UNITED STATES PATENT OFFICE 2,048,866

ANTIROLL DEVICE

John H. Hunt, Detroit, Mich., assignor to General Motors Corporation, Detroit, Mich., a corporation of Delaware Application February 16, 1934, Serial No. 711,463

17 Claims. (Cl. 267—11)

This invention relates to motor vehicles and to the provision therein of an "anti-roll" device which functions to resist and reduce the sideways roll of the vehicle about a longitudinal axis as a result of the turning moment of the centrifugal force acting at the center of gravity of the vehicle about this axis when turning a corner or rounding a curve. The actual degree of roll depends not only on the centrifugal force which varies as the square of the speed and the radius of the turn, but on the stiffness of the springs and on the position of the axis about which the car or vehicle rolls.

Anti-roll devices have been proposed which consist of a rod or tube having suitably spaced lever arms rigidly connected thereto in a plane at right angles to the axis of the rod with connections therefrom each to one of a pair of road wheels on opposite sides of the vehicle, such that any movement of either wheel axis relatively to the frame under the influence of spring deflecting forces is transmitted to the other wheel through the rod, to the extent that the rod is torsionally rigid, and whether the spring deflection arises from the results of centrifugal force or not.

The need for some means to reduce the "roll" of a vehicle is increased as the suspension of the vehicle is softened, and the spring deflection for a given load is increased. The desirable softness of the suspension, particularly of the front dirigible wheels, to give oscillations of a lower and more comfortable frequency is not readily obtainable in a vehicle of conventional construction with a rigid axle interconnecting the two dirigible wheels, but it can be advantageously attained in vehicles with independent suspension of the wheels.

When a softer suspension is used together with independently sprung wheels of the type in which the wheels move in a substantially vertical plane, parallel with the sides of the vehicle, under all conditions of spring deflection, the axis of roll is in the plane of contact of the wheels with the ground and the centrifugal force has a greater moment about this axis than in a vehicle with the conventional axis wherein the axis of roll is approximately in the plane of the wheel centers.

The degree of roll which may occur in a vehicle with soft springs and independent suspension is therefore considerably greater than in the conventional vehicle with a stiffer suspension, and may be uncomfortably excessive, so that some form of anti-roll device becomes very desirable, if not even necessary.

It is obvious that when an anti-roll device, consisting of a rod or tube with lever arms rigidly connected thereto, with connections therefrom each to one of a pair of road wheels on opposite sides of the vehicle, is used, the independence of the road wheels is defeated to the extent that the rod is torsionally rigid and this interferes with the independent action of the road wheels in negotiating inequalities in the road surface when the vehicle is moving in a straight line direction.

The object of the invention is an anti-roll device of the torsion rod type which will be inoperative except when the dirigible wheels have been moved to negotiate a curve and/or centrifugal force tending to cause the roll is present.

According to the invention, the anti-roll connection between one wheel and the other is broken at a suitable point and the adjacent parts are provided with suitable interclutching means adapted to be engaged through the medium of suitable control means responsive to the turning of the steering wheel and/or to the centrifugal force which would otherwise cause the roll.

The control means responsive to centrifugal force may conveniently consist of a pendulum arranged to oscillate in a plane transverse to the longitudinal axis of the vehicle about an axis longitudinally of the vehicle. In operation, the pendulum swings outward about its pivot whenever centrifugal force is present and this movement of the pendulum may be arranged to engage the clutch either directly through suitable mechanical connections, or through the agency of suitable power servo means.

The steering wheel control means may consist of a suitable valve or switch for the servo means operated whenever the steering wheel is turned to deflect the vehicle from a straight line direction of movement.

The two control means may be operative in series or in parallel. In the former case the steering wheel must be turned from its straight ahead position, and centrifugal force must also be operative on the pendulum before the torsion rod can be effective to prevent roll. In the latter case the torsion rod can be effective to prevent roll if either the steering wheel is turned or centrifugal force is operative on the pendulum.

The drawings show various arrangements and modifications of an anti-roll device according to the invention.

In the drawings

Figures 11 to 15 show another embodiment of the invention including a hydraulic servo system for the engagement of the clutch of the anti-roll device.

Figure 1 is a plan view of a motor vehicle chassis having independent suspension of the road wheels front and rear, and in which anti-roll devices on each pair of road wheels are arranged to be made effective through electrical servo means.

Figure 2 is a front elevation of the vehicle chassis.

Figure 3 is a rear elevation of the vehicle chassis.

Figure 4 is an enlarged view of the centrifugally actuated pendulum control means with the cover removed.

Figure 5 is a view, partly in section, on line 5—5 of Figure 4.

Figure 6 is a view on line 6—6 of Figure 7 of a roller type of servo energized clutch for the torsion rod anti-roll device.

Figure 7 is a view on line 7—7 of Figure 6.

Figure 8 is an enlarged part-sectional view of details of the clutch shown in Figures 6 and 7.

Figure 9 is a view of the steering wheel controlled switch for the electrical servo system of Figures 1 to 10.

Figure 10 is an enlarged detail sectional view of a part of Figure 9.

Figure 11 is a plan view of a motor vehicle chassis in which the anti-roll device is arranged to be made effective through hydraulic servo means.

Figure 12 is an enlarged view of the centrifugally actuated pendulum control means for the hydraulic servo means.

Figure 13 is an enlarged part sectional view of a radial toothed dog clutch for the torsion rod anti-roll device.

Figure 14 is a view on line 14—14 of Figure 13.

Figure 15 is an enlarged part-sectional view of the steering wheel controlled valve for the hydraulic servo system of Figures 11 to 15.

Figure 1:
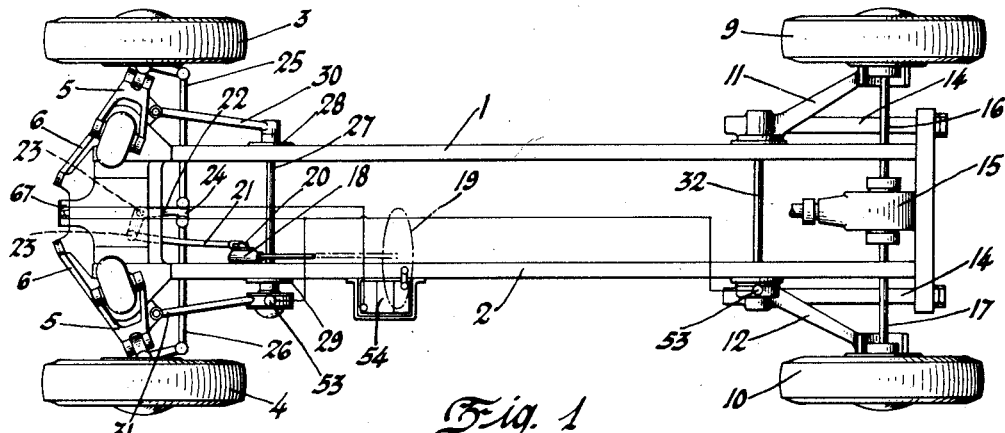
Figures 1 to 10 show one embodiment of the invention including an electrical servo system for the engagement of the clutch of the anti-roll device.
Figure 2:
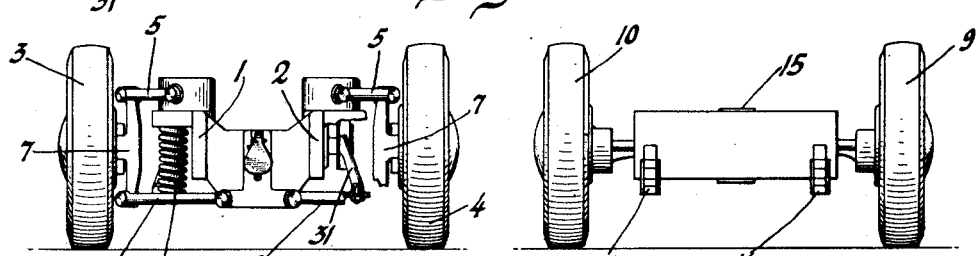
Figure 3:
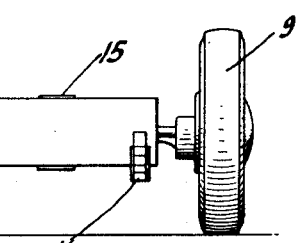

Referring now particularly to Figures 1, 2, 3, and 11, 1 and 2 are the longitudinal frame members of a motor vehicle having independent suspension of the road wheels front and rear.

The front dirigible road wheels 3 and 4 are each supported from the frame through trapezoidal pivotal linkage systems arranged for independent pivotal movement in substantially vertical planes transversely of the vehicle. Each trapezoidal pivotal linkage system consists of V-shaped upper and lower links 5 and 6, each pivoted to the frame with link pins at their apices to which spaced points of a knuckle bracket support member 7 for the road wheel are connected. The frame is resiliently supported on the road wheels and upward swinging movement of the pivotal linkage systems relatively to the frame under the influence of forces at the road wheels is resiliently restrained by coil springs 8, interposed between the frame and each of the lower V-shaped links.

The rear road wheels 9 and 10 are each supported at the ends of lever arms 11 and 12 pivoted to the frame forward of the road wheels for independent swinging movement in a vertical plane about an axis at right angles to the longitudinal axis of the vehicle. Semi-elliptic leaf springs 14 are provided for each lever arm 11 and 12 resiliently restraining pivotal movement of the lever arms about their axes.

The differential gear 15 is suitably supported on the vehicle frame, and 16 and 17 are universally jointed drive shafts therefrom to the road wheels 9 and 10.

The steering gear 18 is provided with the usual steering wheel 19. 20 is the pitman arm connected to the drag link 21 which is connected to the bell crank lever 22 pivoted at 23 and having a T-head 24 to which separate tie rods 25 and 26 to each road wheel 3 and 4 are connected.

An anti-roll device for the front wheels is provided, including a torsion rod 27 suitably mounted for free rotation in bearings 28 and 29 on the frame of the vehicle. A lever arm 30 rigidly connected to one end of the rod 27 has suitable connection with the lower V-shaped link 6 of road wheel 3. Another lever arm 31, normally freely turnable about the other end of the rod 27, has suitable connection with the lower V-shaped link 6 of road wheel 4.

The anti-roll device for the rear wheels includes a torsion rod 32 which may conveniently be coaxial with the pivot axes of the wheel supporting lever arms 11 and 12, which in addition to supporting the road wheels may then function relatively to the rod 32 similarly as the lever arms 30 and 31 function relatively to their rod 27. The lever arm 11 is rigidly connected to one end of the rod 32 while the lever arm 12 is normally freely turnable about the rod 32.

The lever arms 31 and 12 are respectively adapted to be engaged with the rods 27 and 32 through the medium of suitable clutches at such times as the anti-roll devices are required to be operative.

Figures 6, 7, 8, and 16 show one form of suitable clutch for this purpose, as applied between the lever arm 31 and the rod 27 of the front wheels.

Referring now particularly to Figures 6, 7, 8, and 16, the rod 27 projects through the bearing 29 and is provided with the flange or disc member 33 rigidly fixed thereto through the serrations on the tapered end of the rod 27. The flange 33 is provided with flats 34 forming cam-like surfaces equally spaced around its periphery.

An annular space 35 is provided between the periphery of the flange 33 and an outer encircling ring 36.

The ring 36 is rigidly held in a ring member 36' provided with end plates 37 and 38 having bearings 39 and 40 on the rod 27 on opposite sides of the flange 33. The members 36', 37 and 38 constitute a housing for the clutch.

A cage member 41 supported on rollers 42 on the circumferential arc portions of the periphery of flange 33, concentric with the flange 33 and capable of turning through a small angle relative thereto is provided for rollers 43 of which there is one for each of the cam surfaces 34. The rollers 43 are provided with bearing spindles 44 working in radial slots 45 in the cage member 41. These rollers 43 are held radially inwards in the slots 45 and in contact with the cam surfaces 34 by small springs 46 hooked around pegs 47 suitably fixed in the cage member 41 and bearing on the spindles 44 of the rollers.

The diameter of the rollers 43 is such that when they are in a mid-position on the cam surfaces, there is a small clearance between the rollers and the ring 36, but when they are moved relatively to the cam surfaces 34 towards either end thereof, they become wedged between the flange 33 and the ring 36, thereby locking the ring 36 and with it the housing member 36' to the rod 27.

The lever arm 31 is rigidly connected to the housing member 36' which therefore oscillates angularly about its axis under the influence of spring deflecting forces at the road wheels.

The cage member 41 is normally held with the rollers 43 in a mid-position on the cam surfaces 34 of the flange 33 by a spring finger 48 slidingly held in the jaws of lugs 49 and 50 on the flange 33 and the cage member 41 respectively. In this condition the housing member 36' and the flange 33 can move freely relatively to one another and the lever arm 31 and the rod 27 are disconnected.

The cage member 41 may be constrained to turn with the housing member 36' relatively to the flange 33 on the rollers 42 through the medium of a small friction shoe 51 mounted in the housing member 36' and capable of being moved radially thereof into frictional driving engagement with the outer periphery of the cage member 41.

When the cage member 41 is constrained to move with the housing member 36' through the medium of the frictional engagement between these members provided by the friction shoe 51, it moves through only a small angle relatively to the flange 33 before the rollers 43 are wedged between the housing member 36' and the flange 33 thereby rigidly connecting the arm 31 and the rod 27.

The required small amount of turning of cage member 41 relatively to the flange 33 in order to lock the members is permitted by the flexible connecting finger 48.

Figure 16:
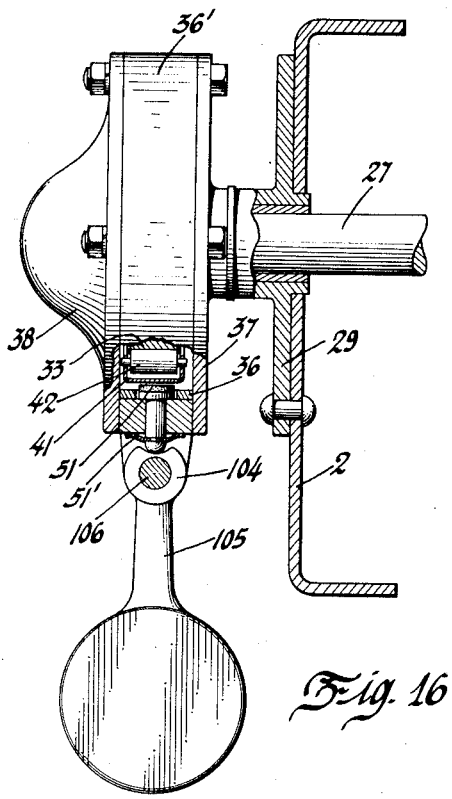
Figure 16 is an enlarged view of a clutch of the kind shown in Figures 6, 7, and 8 arranged to be engaged directly by a centrifugally operated pendulum.

In Figure 16 the friction shoe 51 is moved into frictional engagement with the cage member 41 against the retractive effort of a spring 51' directly by the cam shaped boss 104 of the pendulum 105 pivoted on an axis 106 supported on the housing 36' whenever sufficient centrifugal force is present to swing the pendulum right or left from the position indicated, and thereby engaging the clutch which makes the anti-roll device operative.

Figures 6, 7:
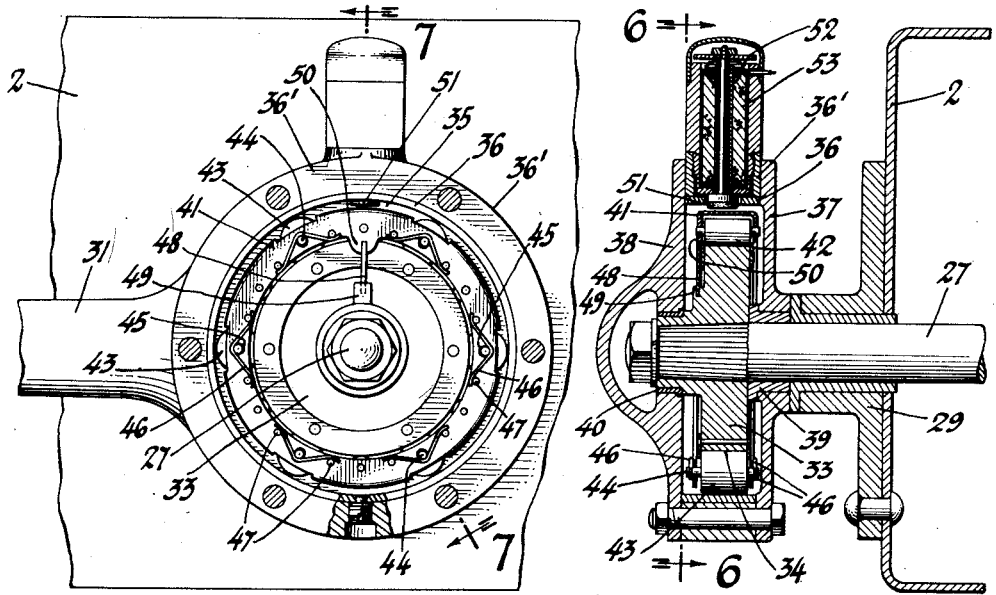
Figure 8:
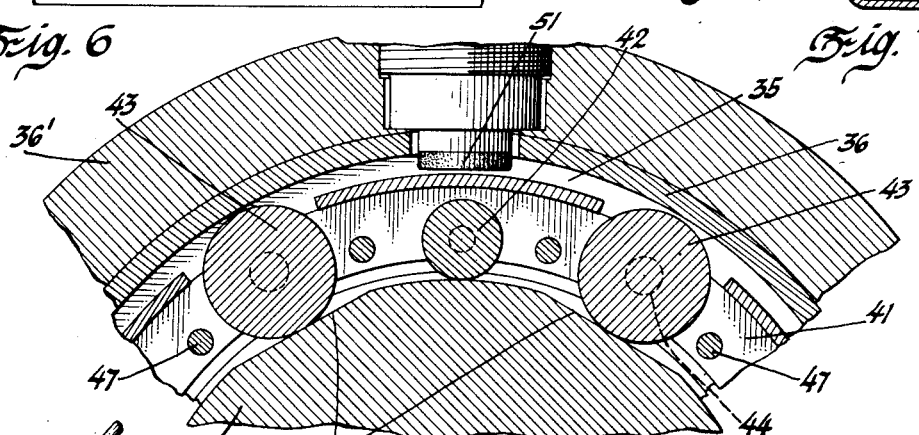

As shown in Figures 6, 7, and 8, the friction shoe 51 is moved into frictional engagement with the cage member 41 against the retractive effort of a coil spring 52 by the solenoid 53, when this is energized by the electric current from the battery 54 of the vehicle, through suitable control switches later to be described.

Figures 13 and 14 show an alternative form of suitable clutch as applied between the lever arm 31 and the rod 27 of the front wheels.

Referring now to Figures 13 and 14, the rod 27 projects through its bearing 29 in the frame side member 2, and is provided with a flange sector 56 rigidly fixed thereto and provided with a boss 57. The sector 56 is provided with radial dog teeth 58 on its outer face adapted to be engaged by a similarly toothed sliding dog clutch member 59 mounted in the hub 60 of the lever 31 which has a bearing 61 on the boss 57 of the sector 56. The hub 60 of the lever 31 constitutes a housing for the clutch and is provided with a cover plate 62 having a suitable bearing 63 on the rod 27.

As shown the clutch is engaged by movement of the member 59 against the retractive effort of the coil spring 64 by hydraulic pressure from a suitable source acting on the sylphon 65 through pipe 66 and controlled through suitable valves later to be described.

The electrical control switches for the clutch shown in Figures 6, 7, and 8, are shown in Figures 4 and 5, and 9 and 10.

Figure 4:
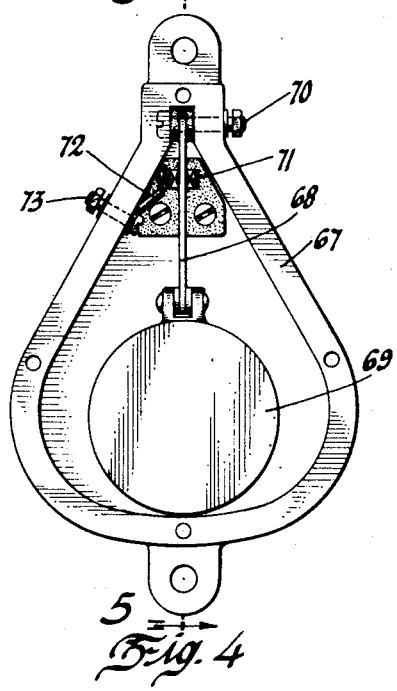
Figure 5:
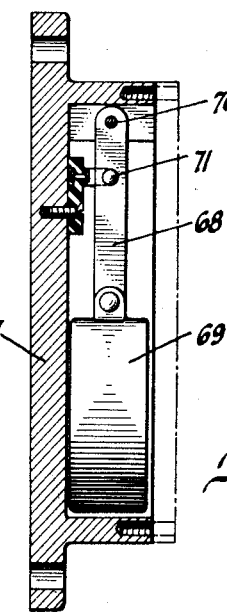

Referring now to Figures 4 and 5, 67 is a housing for a pendulum 68 having a weight 69 which is capable of swinging in the plane of Figure 4 about a pivot provided by the terminal bolt 70 which is insulated in the housing but in electrical contact at all times with the supported end of the pendulum 68. In swinging either right or left, the pendulum makes contact with the points of an electrical conducting piece 71 insulated from the housing 67 but provided with a conductor 72 to the terminal bolt 73 which is insulated from the housing.

The pendulum switch in its housing is mounted on the vehicle, in the circuit from the battery through the clutch, in a suitable position to swing right or left under the influence of centrifugal force and preferably at the extreme front of the vehicle as shown in Figure 1, since the front end of the vehicle is subjected to the side thrust first.

The pendulum 68 thus automatically closes the circuit between the terminal bolt 70 and the terminal bolt 73 when there is sufficient centrifugal force present to swing the pendulum from its vertical position into contact with the conducting piece 71 and engages the clutch which makes the anti-roll device operative.

Figure 9:
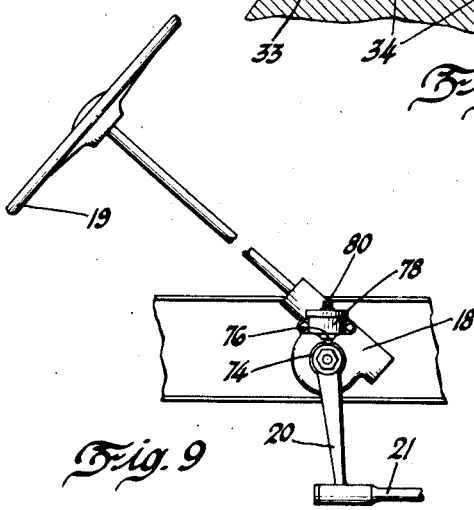
Figure 10:
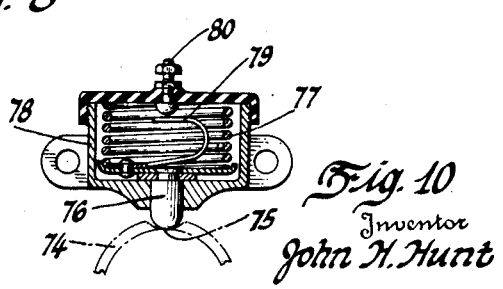

Referring now to Figures 9, 10, and 15, the boss 74 of the pitman arm 20 of the steering gear 18 is provided with a cam surface consisting of a depression 75 coacting with a plunger 76 yieldingly urged into contact with the cam surface by a spring 77. The relationship of the parts is such that, when the steering wheel 19 is turned to move the pitman arm 20 in either direction from the position shown and which corresponds to the position of the dirigible road wheels for straight ahead movement of the vehicle, the plunger 76 is pressed upwards against the resistance of spring 77.

In Figures 9 and 10, the plunger 76 is mounted in a swtich box 78 and is employed to move the spring terminal 79 which is attached to the plunger 76 into contact with the insulated terminal 80, thereby closing the circuit through the terminal 80 to the vehicle frame.

Figure 17:
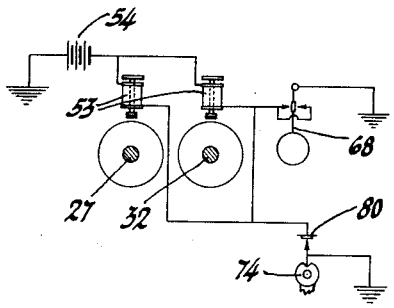
Figure 17 is a diagrammatic view of the anti-roll device with electrical servo system having the steering wheel and pendulum control switches arranged in parallel.

In the arrangement shown diagrammatically in Figure 17, the electrically controlled clutches for the rods 27 and 32 are arranged with the centrifugally actuated switch and the steering gear switch in parallel so that the clutches will be engaged when either switch is closed.

Figure 18:
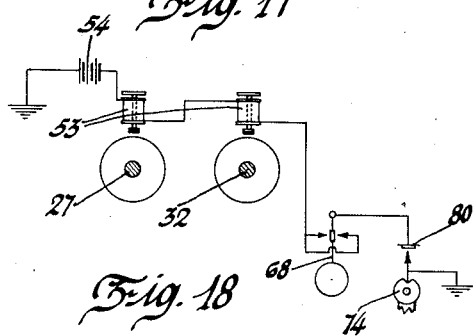
Figure 18 is a diagrammatic view of the anti-roll device with electrical servo system having the steering wheel and pendulum control switches arranged in series.

In the arrangement shown diagrammatically in Figure 18, the two switching means are arranged in series so that the clutches will be engaged only when both switches are closed.

The hydraulic control valves for the clutch shown in Figures 13 and 14 are shown in Figures 12 and 15.

Referring now particularly to Figure 12, 81 is a housing for a pendulum 82 having a weight 83 which is capable of swinging about a pivot 84 supported in the housing. Small springs 85 are provided, tending to hold the pendulum in a central position. The pendulum is extended above its pivot 84 and is provided with a slotted hole 85 for a link pin 86 on the stem of a hollow balanced piston valve 87 in a valve chamber 88. The chamber 89 is at all times filled with fluid under pressure from a suitable source which may be the engine oil pump 90 of Figure 11. Suitable ports 91 and 92 are provided between the valve chamber 88 and a chamber 93 which is in communication with the pipe line 66 which leads to the sylphon 65 of Figure 13.

In the central position of the piston valve 87 as shown the chamber 93 is open to a pressure relief conduit 94 through the duct 95 and the annular groove 96 in the periphery of the piston valve 87. The duct 95 is closed and one or the other of the ports 91 and 92 is uncovered by suitable control edges on the piston valve 87 in its axial movement in either direction from the position indicated. This axial movement of the piston valve 87 is effected through its interlinkage with the extension of the pendulum 82 which, complete with its housing, is mounted on the vehicle to swing right or left under the influence of centrifugal force and preferably at the extreme front end of the vehicle as seen in Figure 11.

If the pendulum 82 swings to the left in Figure 12 the piston valve 87 moves to the right and the fluid under pressure flows from the chamber 89 through the duct 97 in the piston valve 87 and thence through the port 91 to the chamber 93 and thence to the sylphon 65.

If the pendulum 82 swings to the right in Figure 12, the fluid under pressure flows from the chamber 89 through the annular space provided between the reduced portion 98 of the valve 87 and the walls of the valve chamber 88 and thence through the port 92 to the chamber 93 and thence to the sylphon 65.

The pendulum 82 thus automatically opens the ports 91 and 92 and closes the duct 95 to the relief conduit 94 when there is sufficient centrifugal force present to swing the pendulum and the valve from their central position thereby admitting fluid under pressure to the sylphon 65 and engaging the clutch which makes the anti-roll device operative.

Referring now particularly to Figure 15, the plunger 76 is mounted in a valve chamber 99 which is provided with a port 100 for fluid under pressure from a suitable source which may be the engine oil pump 90 of Figure 11, and a port 101 leading to the sylphon 65 of Figure 13. Two further ports 102 and 103 are provided in the valve chamber 99 which may be put into communication with one another through an annular groove 104 in the periphery of the plunger to serve for the relief of fluid pressure from the sylphon 65. The relationship of the ports to the plunger is such that in the position of the parts illustrated, and which corresponds to the position of the dirigible road wheels for straight ahead movement of the vehicle, the ports 100 and 101 are closed while the ports 102 and 103 are open and in communication with one another through the annular groove 104.

Figure 19:
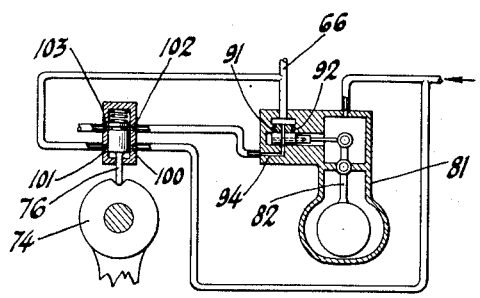
Figure 19 is a diagrammatic view of the anti-roll device with hydraulic servo system having the steering wheel and pendulum control valves arranged in parallel.

In the arrangement shown diagrammatically in Figure 19, the centrifugally controlled valve and the steering gear controlled valve for the hydraulically operated clutches are arranged in parallel with the relief conduit 94 of the centrifugally operated valve connected to the relief port 102 of the steering gear controlled valve. The pipe connections are such that fluid pressure is only relieved in the pipe 66 to the sylphon when all the pressure ports 91, 92, 100 and 101 are closed, while there is no relief through the ports 102 and 103 when any of the ports 91, 92, 100 and 101 are open and the clutches are accordingly engaged.

Figure 20:
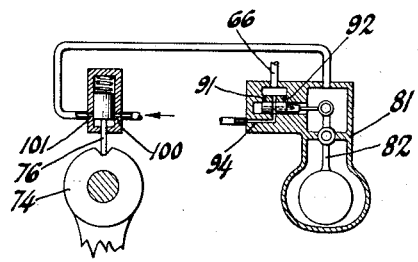
Figure 20 is a diagrammatic view of the anti-roll device with hydraulic servo system having the steering wheel and pendulum control valves arranged in series.

In the arrangement shown diagrammatically in Figure 20, the two valve control means are arranged in series and the relief ports 102 and 103 are not then required. One of the ports 91 and 92 and the ports 100 and 101 must be open before the clutches can be engaged and the fluid pressure is always relieved through the relief conduit 94 at all other times.

It will be appreciated that the invention is not limited in its application to both front and rear wheels of the car as illustrated, nor to its use with any specific kind of suspension, and that, for example, the anti-roll device might be applied to either the front or the rear wheels alone and to a vehicle with conventional axles.

It is also apparent that the clutches for the anti-roll device might be operated by any suitable means, servo or otherwise, and that either of the automatic control means responsive to centrifugal force or to the movement of the dirigible wheels might be used singly, as well as in parallel or in series, as illustrated.

I claim:

1. In a vehicle including a frame resiliently supported on road wheels on opposite sides of the vehicle, a torsion rod interconnected with the axes of wheels on opposite sides of the vehicle, through suitable engageable and disengageable clutch means, whereby, when the clutch is engaged, the axes of said wheels on opposite sides of the vehicle are constrained to move together in the same direction, a substantially equal extent, relatively to the frame, and power servo means controlled by a member responsive to a force acting on the vehicle, automatically effecting engagement of the clutch when the vehicle is moving in a curved path.

2. A motor vehicle, according to claim 1, in which the servo means automatically effecting engagement of the clutch is controlled by a pendulum responsive to centrifugal force.

3. In a vehicle having steering means for dirigible road wheels, a frame resiliently supported on road wheels, on opposite sides of the vehicle, a member interconnected with the axes of wheels on opposite sides of the vehicle through suitable engageable and disengageable clutch means, whereby, when the clutch is engaged, the axes of said wheels on opposite sides of the vehicle are constrained to move together in the same direction, a substantially equal extent, relatively to the frame, and means automatically effecting engagement of the clutch, said means including electrical servo means controlled by a switch which is operated by a pendulum responsive to centrifugal force, when the vehicle is moving in a curved path, and a switch which is operated by a movement of the steering means to a position removed from its position for movement of the vehicle in a straight line path.

4. A vehicle, according to claim 3, in which the switch operated by a pendulum and the switch operated by a movement of the steering means, are arranged in series.

5. A vehicle, according to claim 3, in which the switch operated by a pendulum and the switch operated by a movement of the steering means, are arranged in parallel.

6. In a vehicle having steering means for dirigible road wheels, a frame resiliently supported on road wheels, on opposite sides of the vehicle, a member interconnected with the axes of wheels on opposite sides of the vehicle through suitable engageable and disengageable clutch means, whereby, when the clutch is engaged, the axes of said wheels on opposite sides of the vehicle are constrained to move together in the same direction, a substantially equal extent, relatively to the frame and means automatically effecting engagement of the clutch, said means including hydraulic servo means controlled by a valve which is operated by a pendulum responsive to centrifugal force when the vehicle is moving in a curved path, and a valve which is operated by a movement of the steering means to a position removed from its position for movement of the vehicle in a straight line path.

7. A vehicle, according to claim 6, in which the valve operated by a pendulum and the valve operated by a movement of the steering means are arranged in series.

8. A vehicle, according to claim 6, in which the valve operated by a pendulum and the valve operated by a movement of the steering means are arranged in parallel.

9. In a vehicle including a frame resiliently supported on road wheels on opposite sides of the vehicle, a torsion rod interconnected with the axes of wheels on opposite sides of the vehicle, through an automatically engageable and disengageable two-way roller clutch and means whereby, when the vehicle is moving in a curved path, the clutch is engaged and the axes of said wheels on opposite sides of the vehicle are constrained to move together in the same direction, a substantially equal extent relatively to the frame.

10. A vehicle, according to claim 9, in which the means whereby the clutch is engaged when the vehicle is moving in a curved path, include a pendulum responsive to centrifugal force.

11. A vehicle, according to claim 9, in which the means whereby the clutch is engaged when the vehicle is moving in a curved path, include means responsive to a movement of the vehicle steering means to a position removed from its position for movement of the vehicle in a straight line path.

12. In a vehicle including a frame resiliently supported on road wheels on opposite sides of the vehicle, a torsion rod interconnected with the axes of wheels on opposite sides of the vehicle through an automatically engageable and disengageable radial dog clutch and means whereby, when the vehicle is moving in a curved path, the clutch is engaged and the axes of said wheels on opposite sides of the vehicle are constrained to move together in the same direction, a substantially equal extent relatively to the frame.

13. A vehicle, according to claim 12, in which the means whereby the clutch is engaged when the vehicle is moving in a curved path, include a pendulum responsive to centrifugal force.

14. A vehicle, according to claim 12, in which the means whereby the clutch is engaged when the vehicle is moving in a curved path, include means responsive to a movement of the vehicle steering means to a position removed from its position for movement of the vehicle in a straight line path.

15. A motor vehicle, according to claim 1, in which the servo means automatically effecting engagement of the clutch is controlled by a pendulum responsive to centrifugal force, said pendulum being mounted at the front end of the vehicle which is that end thereof first to be subjected to the said centrifugal force.

16. In a vehicle having steering means for dirigible road wheels, a frame resiliently supported on road wheels, on opposite sides of the vehicle, a member interconnected with the axes of wheels on opposite sides of the vehicle through suitable engageable and disengageable clutch means, whereby, when the clutch is engaged, the axes of said wheels on opposite sides of the vehicle are constrained to move together in the same direction, a substantially equal extent, relatively to the frame, and means automatically effecting engagement of the clutch, said means including, electrical servo means controlled by a switch which is operated by a pendulum responsive to centrifugal force, when the vehicle is moving in a curved path, said pendulum being mounted at the front end of the vehicle which is that end thereof first to be subjected to the said centrifugal force, and a switch which is operated by a movement of the steering means to a position removed from its position for movement of the vehicle in a straight line path.

17. In a vehicle having steering means for dirigible road wheels, a frame resiliently supported on road wheels, on opposite sides of the vehicle, a member interconnected with the axes of wheels on opposite sides of the vehicle through suitable engageable and disengageable clutch means, whereby, when the clutch is engaged, the axes of said wheels on opposite sides of the vehicle are constrained to move together in the same direction, a substantially equal extent, relatively to the frame and means automatically effecting engagement of the clutch, said means including, hydraulic servo means controlled by a valve which is operated by a pendulum responsive to centrifugal force when the vehicle is moving in a curved path, said pendulum being mounted at the front end of the vehicle which is that end thereof first to be subjected to the said centrifugal force, and a valve which is operated by a movement of the steering means to a position removed from its position for movement of the vehicle in a straight line path.

JOHN H. HUNT.